Nov. 12, 1968   I. D. JOHNSON ET AL   3,410,764
CORROSION DETECTING AND ANALYZING DEVICES
Filed Dec. 9, 1964
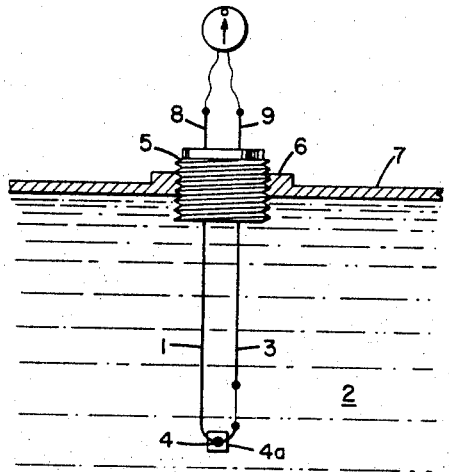
Fig.1
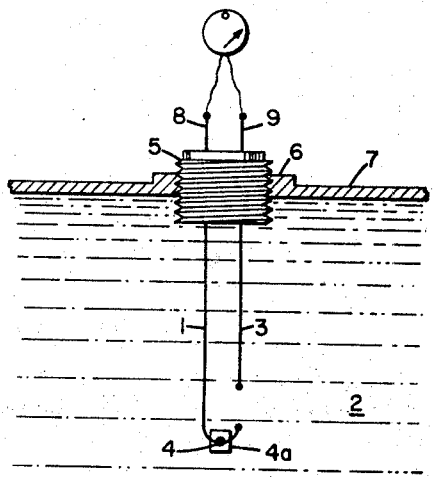
Fig.1a
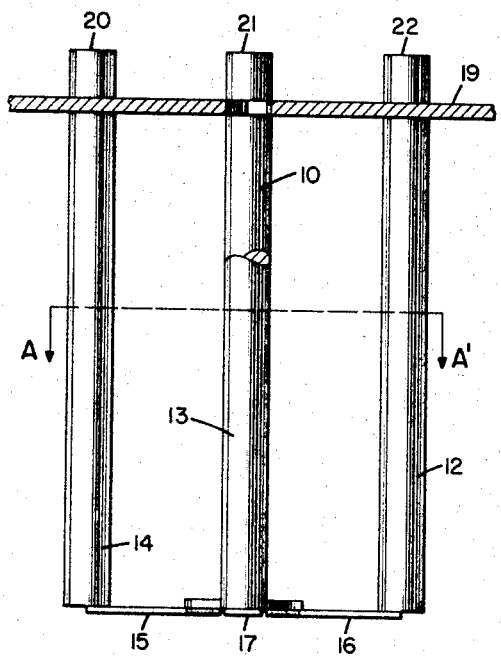
Fig.2
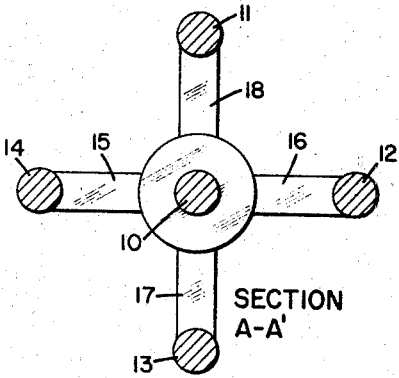
SECTION A-A'
INVENTORS
DENNY L. GRAHAM
IRVIN D. JOHNSON
BY Richard C. Hilson Jr.
ATTORNEY

United States Patent Office 3,410,764
Patented Nov. 12, 1968

3,410,764
CORROSION DETECTING AND ANALYZING DEVICES
Irvin D. Johnson and Denny L. Graham, Littleton, Colo., assignors to Marathon Oil Company, Findlay, Ohio, a corporation of Ohio
Filed Dec. 9, 1964, Ser. No. 417,072
9 Claims. (Cl. 204—1)

ABSTRACT OF THE DISCLOSURE

The present invention comprises a device of the class described consisting essentially of electrically insulating mounting means, at least two dissimilar metallic elements held in spaced electrically insulated relationship by said mounting means, each of said metallic elements having a contact point for contacting one of the poles of an electrical potential detecting means, said metallic elements being electrically joined together by a corrodible metallic linking means, whereby when said metallic elements are partially immersed in an electrolyte with said contact points outside said electrolyte and said juncture means within said electrolyte, a corrosive within said electrolyte will gradually corrode said linking means until it is severed, and the action of the electrolyte on the metallic elements will set up an electrical potential between said contact points.

---

This invention relates to novel self-powered devices for indicating corrosion in the presence of an electrolyte which devices are also useful for the detection of the specific corrosive substances in the environment in which they are located.

The use of thin test specimens of corrodible metal for the determination of the resistance of various materials to corrosive environments is a common practice in the chemical, petroleum, paint and other industries interested in protecting against corrosion of corrodible articles. Most commonly, weight loss or visual inspection is used to indicate the presence or absence of corrosion on such test specimens. More recently, electrical circuits having corrodible links which are located in the corrosive environment and connected in series with external sources of power and current flow detectors have been developed. When the corrodible link is severed by corrosion, the circuit is opened and the flow of current through the current indicating device stops, giving a visible, audible or other signal of the occurrence of the corrosion. Such devices have found relatively wide use in long pipe lines.

The present invention offers corrosion detection devices which are self-powered and require no external source of electricity and are therefore useful even in remote locations where changing of batteries or maintenance of electric wires would be difficult over the years in which they can remain installed.

In its simplest form, the invention comprises two elements of dissimilar metals suspended (preferably approximately parallel) in a spaced relationship and electrically insulated from each other except at a juncture point where they are electrically connected. A substantial portion of the metallic elements is immersed in the electrolyte in which corrosion is to be detected and the elements will preferably have at least one thin spot at which they are more readily severed by corrosion at a point some distance below the surface of the electrolyte. Once one of the members has been severed by corrosion, the device becomes a simple wet cell galvanic battery comprising two dissimilar metals spaced apart and electrically insulated from each other in an electrolyte. According to well-known principles of galvanic cells, a potential will therefore be set up between the dissimilar metals and any electrical instrument for detecting an electrical potential between two points, including instruments used for the detection of current flow such as milliammeters, may be utilized to detect the severing of the link between the metallic elements by corrosion.

FIGURE 1 is a schematic drawing of a preferred detection device according to the present invention.

FIGURE 2 is a somewhat more complex device utilizing the present invention to detect the presence of specific corrosives in the electrolyte in which the detection device is immersed.

In FIGURE 1, a strip of silver 1, relatively non-corrodible by the electrolyte 2, is joined to a strip of steel 3, at an electrically conductive juncture point 4. 4a is a non-corrodible coating protecting the juncture of strips 1 and 3 to prevent excessive corrosion where the dissimilar metals meet. Both strips extend through an insulating plug 5 which is screwed into a conventional outlet 6 located in the container 7, which is to be protected against corrosion. The extensions of the two strips through the insulating plug form contact points 8 and 9 for the silver and steel strips, respectively. A voltmeter connected across the contact points 8 and 9 shows no electrical potential between the points.

FIGURE 1a shows the detection device of FIGURE 1 after corrosion has severed the more corrodible strip 3. The upper portions of the two strips immersed in the electrolyte form a simple battery and cause a deflection of the voltmeter indicating that sufficient corrosion has occurred to sever the strip. By making the corrodible strip 3 quite thin over at least a portion of its length, an early warning of corrosion can be obtained before significant damage has been done to the container 7.

In operation, the device shown in FIGURE 1 is installed in a tank, pressure vessel, pipe line or other corrodible object which is to be protected. Where the contacts 8 and 9 are not readily accessible, they may be extended by connecting them to insulated wires running to a more accessible point. If the accessible point is far removed from the contacts, it may be necessary to install one or more conventional electronic amplifiers to amplify any signal from the device, but in general, since such amplifiers will require a source of external power, their use will not be preferred.

The contacts 8 and 9 may be connected permanently to a voltmeter, milliammeter, galvanometer, or similar indicating device or alternatively they may be simply left exposed and such a device periodically connected to the contacts.

Under normal, satisfactory conditions within the container 7 there will be no potential difference between the contacts 8 and 9 and a galvanometer, voltmeter, or milliammeter connected across them will show no deflection.

Should the electrolyte 2, for example, an aqueous NaCl solution, become corrosive, the more readily corrodible of the metal elements will be severed at its weakest point, e.g., the thin spot shown in element 3. The upper portion of the severed element then forms a simple galvanic cell with the other element and the electrolyte, causing a potential difference between contacts 8 and 9. An electrical measuring device then will indicate that the device of the present invention has been severed and an early indication of corrosive electrolyte is thus obtained.

In place of a thin spot, a more readily corrodible metal may be substituted for a portion of either of the elements 1 or 3. In general it will be preferable to use a metal which corrodes at about the same rate as the container 7 or the metal from which the container is fabricated so that only corrosive agents which would harm the container will be detected.

FIGURE 2 shows a somewhat more complex device utilizing a single corrosion-resistant elongated metal element, 10, surrounded by elements of different metals 11–14. These peripheral elongated electrodes 11–14 are individually joined to element 10 by thin strips of four different corrodible metals, 15–18, respectively. All of the metal elements extend through an insulating flange 19 forming contacts 20, 21, 22, etc.

In operation, under noncorrosive conditions, there will be no difference in potential between the contacts. However, should one of the thin metallic elements 15–18 be severed, an electrical potential will be set up between the center electrode 10 and the peripheral electrode formerly connected by the severed element.

By selecting thin metal elements 15–18 which are susceptible to different types of corrosion, the device may be used as a qualitative analyzer of the corrosive agent in the stream. Alternatively, the thin strips 15–18 may all be made of the same metal but of various thicknesses in order to give some quantitative indication of the degree of corrosion which the device has suffered.

Under some conditions it may be useful to employ a variety of metals or metal alloys having different locations in the electromotive series to construct the peripheral electrodes 11–14 in order that the electrical potential generated will indicate which of the thin strips 15–18 has failed. A number of other variations are obviously possible.

In general, the spacing of the elongated metal elements will not be critical but they must be sufficiently close that a detectable electrical potential or current flow will be set up when the metal linkage between them has been severed by corrosion. The electrodes need not, of course, be flat strips of material but may have the characteristic "crow's-foot" configuration commonly used in galvanic cells or some other configuration which is electrically advantageous or is dictated by spatial considerations.

Similarly, the general considerations governing construction of galvanic cells are applicable to the selection of metals for the electrodes. Thus, while silver, steel, copper, zinc, and aluminum will be preferred, other metals and alloys will be found appropriate under specific conditions. Also, other geometric arrangements and other valuable applications will be apparent to those skilled in the art, and the present invention is to be understood to include all such variations.

What is claimed is:

1. A device of the class described consisting essentially of electrically insulating mounting means, at least two dissimilar metallic elements held in spaced electrically insulated relationship by said mounting means, each of said metallic elements having a contact point for contacting one of the poles of an electrical potential detecting means, said metallic elements being electrically joined together by a corrodible metallic linking means, whereby when said metallic elements are partially immersed in an electrolyte with said contact points outside said electrolyte and said metallic linking means within said electrolyte, a corrosive substance within said electrolyte will gradually corrode said metallic linking means until it is severed, and the action of the electrolyte on the metallic elements will set up an electrical potential between said contact points, and whereby in the absence of such severing by corrosive condition there will be no difference in potential between the contact points.

2. A corrosion detecting device having an integral current generating feature permitting the actuation of signaling devices without need for external power supplies consisting essentially of at least two dissimilar electrically conducting elongated metallic elements joined by at least one corrodible metal linking means, each of said elements have a contact point for contacting the poles of an electrical potential detecting means, said contact point being in insulated spaced relationship with the contact point of others of said elongated elements, said metal linking means and a substantial portion of said elongated elements being adapted for immersion in a possibly corrosive electrolyte with said contact points positioned outside said electrolyte, whereby if corrosion takes place to sever the linking means, the action of the electrolyte on the metallic elements will set up an electrical potential between the contact points and whereby in the absence of such severing by corrosion, there will be no difference in potential between the contact points.

3. A corrosion detection device for indicating the corrosion of a corrodible container containing electrolyte which device consists essentially of at least two elongated electrically conductive dissimilar metal elements having parallel portions running in spaced parallel galvanic-cell-forming relationship to one another, contact points permitting the attachment of electrically measuring devices to determine differences in electrical potential between said elements, and juncture means connecting each of said elements to at least one other element whereby when said elements are severed by corrosion in the presence of an electrolyte by the action of the electrolyte on said elements, there is set up between two of said contact points a difference in electrical potential which may be measured by attachment of an electrical measuring instrument to said contact points, and whereby in the absence of such severing by corrosive condition, there will be no difference in potential between said contact points.

4. The device of claim 3 in which the parallel portion of each of the elongated metal elements is located between the juncture means and the contact point on that element, and where the juncture means beween elements is protected from corrosion in order to prevent its corroding more rapidly than other portions of the element.

5. The device of claim 3 wherein one of the elongated metallic elements is composed of the metal of the corrodible container and has a portion readily severable by corrosion and adapted for submerging a substantial distance within the electrolyte.

6. The device of claim 5 wherein at least one of the elements is composed of a metal which is not appreciably corroded by the electrolyte.

7. A system for the detection of corrosion of containers fabricated of corrodible materials and containing electrolytes which system consists essentially of electrical measuring means for detecting a difference in electrical potential, at least two elongated metallic elements having portions parallel to one another in spaced electrically insulated relationship and being electrically joined to each other near one of their ends by metal linking means severable by corrosion, each of said elements having a contact point to which the said electrical measuring means can be attached to determine the presence of an electrical potential between the contact points of the various elongated metallic elements caused by the action of said electrolyte on said elements, and whereby in the absence of such severing by corrosive condition there will be no difference in potential between the contact points.

8. The system of claim 7 wherein at least one of the elements is fabricated of the same material as was used to fabricate the container and another of said elements is of a material substantially noncorrodible by the electrolyte and where the juncture point between elements is protected from corrosion.

9. A process for the detection of corrosion comprising submerging at least two elongated dissimilar metallic elements in spaced electrically insulated parallel relation in an electrolyte, said elements being electrically joined within the electrolyte by a corrodible link and periodically measuring any electrical potential between said metallic elements caused by the severing action of said electrolyte on said elements, whereby any such potential indicates corrosion has occurred on said link, and whereby in the absence of such severing by corrosive condition, there will be no difference in potential between said metallic elements.

(References on following page)

References Cited

UNITED STATES PATENTS

| | | | |
|---|---|---|---|
| 2,358,981 | 9/1944 | Lattner | 204—197 |
| 2,726,205 | 12/1955 | Marshall et al. | 204—197 |
| 2,741,182 | 4/1956 | Faust et al. | 102—70.2 |
| 3,036,139 | 5/1962 | Feduska et al. | 136—237 |
| 3,065,151 | 11/1962 | Schaschl et al. | 204—1.1 |
| 3,265,598 | 8/1966 | Rohrman | 204—148 |
| 3,308,046 | 3/1967 | Suleski | 204—196 |

FOREIGN PATENTS 211,206 11/1957 Australia.

OTHER REFERENCES

"Temperature, Its Measurement and Control in Science and Industry," Reinhold Pub. Corp., New York, 1941, pp. 188–190 and 1309–1311.

HOWARD S. WILLIAMS, *Primary Examiner.*

T. TUNG, *Assistant Examiner.*